United States Patent [19]

Page et al.

[11] 4,384,661
[45] May 24, 1983

[54] AEROSOL WATER-BASED PAINT COMPOSITIONS

[76] Inventors: Edward H. Page, 1021 Hillcrest Rd., Ridgewood, N.J. 07450; Frank Scotti, 450 Indian Rd., Wayne, N.J. 07470

[21] Appl. No.: 366,153

[22] Filed: Apr. 7, 1982

[51] Int. Cl.$^3$ .......................................... B65D 83/00
[52] U.S. Cl. .................................... 222/394; 252/305; 524/375; 524/376; 524/378; 524/425; 524/903
[58] Field of Search ............... 524/425, 378, 375, 376, 524/903; 222/394; 252/305

[56] References Cited

U.S. PATENT DOCUMENTS

| | | | |
|---|---|---|---|
| 2,524,590 | 10/1950 | Boe | 252/305 |
| 3,096,001 | 7/1963 | Boe et al. | 222/135 |
| 3,207,386 | 9/1965 | Presant et al. | 222/394 |
| 3,305,510 | 2/1967 | Gauder | 524/378 |
| 3,305,511 | 2/1967 | Gauder | 524/378 |
| 3,305,512 | 2/1967 | Gauder | 524/378 |
| 3,305,513 | 2/1967 | Gauder | 524/378 |
| 3,330,730 | 7/1967 | Hernandez | 167/85 |
| 3,413,254 | 11/1968 | Gauder | 524/378 |
| 3,419,506 | 12/1968 | Gauder | 521/78 |
| 3,547,854 | 12/1970 | Roth | 524/378 |
| 3,998,775 | 12/1976 | Taub | 260/29.6 MN |
| 4,265,797 | 5/1981 | Suk | 260/29.6 E |

FOREIGN PATENT DOCUMENTS 2028364 3/1980 United Kingdom .

OTHER PUBLICATIONS

Aerofako by Netherlands, "States Report May 1981, Dimethylether Pure, A Promising Aerosol Propellant", May 11, 1981, CSMA 67 Midyear Meeting, Chicago, Ill., pp. 1–7.
Sciara, Aerosol Pain Propellants, *Paint and Varnish Production* (1963).
Bohnenn, Dimethylether Pure, *Aerosol Age*, p. 26, Jan. 1981.
Bohnenn, Dimethylether Pure, Part II, *Aerosol Age*, Feb. 1981.
Freon Product Information, *Aerosol Age*, Nov. 1960.
Chem. Abstracts, 78,113066e.
Chem. Abstracts, 85,112657f.

*Primary Examiner*—Morton Foelak

[57] ABSTRACT

This invention concerns sprayable, non-foaming emulsions of a film-forming polymer in water which are useful as aerosol paint sprays.

19 Claims, No Drawings

AEROSOL WATER-BASED PAINT COMPOSITIONS

FIELD OF THE INVENTION

This invention relates to water-based paint formulations suitable for dispensing from an aerosol container.

BACKGROUND OF THE INVENTION

Polymer-based paint compositions suitable to be sprayed from pressurized aerosol containers are desirably formulated so that objectionable foaming of the dispensed paint film does not occur. Foaming results in marring or pocking of the dried polymer-pigment film.

In addition, the paint formulation which is dispensed from an aerosol container should be of sufficient mechanical stability to withstand the mechanical shearing forces which occur during dispensing from a conventional aerosol container. Aerosol formulations having insufficient mechanical stability produce films having an uneven surface marred by agglomerated bits of the polymeric component or formulations which clog the narrow orifices in the aerosol valve outlet.

Currently marketed aerosol paints having appropriate mechanical stability are entirely solvent-based systems, employing hydrocarbon- or alcohol-based solvents which employ little, if any, water. In such formulations, the polymer-pigment concentrate may be formulated in a liquid hydrocarbon, such as kerosene, and propelled by a kerosene soluble propellant such as isobutane, or a fluorocarbon. It is necessary to maintain a low viscosity in polymer-pigment concentrates in order to provide rapid escape of the propellant from the film, thus eliminating foam-pocking, and providing a coherent and even layer of the polymeric component of the aerosol formulation. Although such solvent-based systems can be formulated to suppress foaming upon spray application, alcohol- or hydrocarbon-based concentrates are disadvantageous due to their high flammability and/or high toxicity. Aerosol-dispensed paint compositions in which the sprayable concentrate is a polymer-in-water emulsion would ameliorate many of the disadvantages associated with the use of toxic and flammable alcohol- or hydro-carbon-based paint sprays.

In light of the environmental hazards associated with aerosol propellants such as the commonly employed fluorocarbon propellants, it is also important to employ a propellant which is environmentally safe. The propellant dimethyl ether is environmentally safe and also possesses a low flammability when used in combination with water. However, the prior art does not disclose dimethyl ether-propelled, water-based polymer emulsions suitable for use as aerosol dispensed film-formers which are free of objectionable foaming upon spraying and at the same time possess the degree of mechanical stability required for aerosol dispensed formulations.

Accordingly, it is an object of the present invention to provide a dimethyl ether-propelled aqueous polymer emulsion which will deliver a smooth and unfoamed film when applied to a substrate from a conventional aerosol dispenser. The formulations of this invention are well suited for use as aerosol water-based paints and for this purpose may be formulated with conventional pigments.

It is another object of this invention to provide an aerosol dispenser containing the composition of this invention which dispenses an aqueous polymer emulsion so as to provide a smooth, unpocked film on the surface to which it is applied.

SUMMARY OF THE INVENTION

In accordance with the foregoing objectives, the present invention provides a composition suitable for dispensing from an aerosol container by action of dimethyl ether propellant, comprising a film-forming polymer emulsified in an aqueous solution of dimethyl ether, wherein the film-forming polymer is emulsified by a nonionic surfactant having a hydrophile-lipophile (hereinafter HLB) value of at least about 14 or higher.

This invention also provides a self-propelled liquid (aerosol) dispenser containing therein a composition comprising a film-forming polymer emulsified in an aqueous solution of dimethyl ether, wherein the film-forming polymer is emulsified by a nonionic surfactant having an HLB value of at least about 14, and the composition includes dimethyl ether in an amount sufficient to propel a spray comprised of the emulsion from said container and onto the surface of a substrate.

DETAILED DESCRIPTION OF THE INVENTION

The compositions of this invention are comprised of an aqueous emulsion of a film-forming polymer which is further emulsified in an aqueous solution of dimethyl ether by a nonionic surfactant. As will be discussed in detail below, the nonionic surfactant employed must possess an HLB value of about 14 or higher in order to provide an emulsified aerosol formulation of adequate mechanical stability which does not objectionably foam upon dispensing.

The polymer component is suitably in the form of an oil. The aqueous phase of the emulsion is the continuous phase of the emulsion, with the polymeric component being emulsified and dispersed therein. The emulsions of this invention are pressurized by dimethyl ether by, for example, adding liquified dimethyl ether to an aerosol container containing an aqueous concentrate of the film-forming polymer and nonionic surfactant emulsifier.

The compositions of the invention present in a suitable dispenser or container comprise about 2 to about 25 parts by weight, and preferably about 3 to about 15 parts by weight, of the polymeric solids component. As will be discussed below, when the composition is prepared from a preformed aqueous emulsion polymer, the polymeric emulsion may represent from about 15 to about 30 parts by weight of the composition. The compositions of this invention also include about 0.3 to about 3.0 parts by weight, and preferably about 0.5 to about 2.0 parts by weight of the nonionic surfactant; about 0.2 to about 10 parts by weight of a pigment and about 20 to 80 parts water, with the dimethyl ether gas being present in this composition in an amount sufficient to propel the emulsion of the film forming polymer from the dispenser.

Typically, the emulsions will include about 10 to about 40 parts, preferably about 15 to about 35 parts by weight of dimethyl ether at an internal aerosol container pressure of about 40–60 psi and at about room temperature.

The composition may comprise about 5 to about 35% by weight total solids. For example, the composition may comprise about 5% to about 15% polymer solids, about 0.3 to about 10% pigment, about 0.5 to about 2.0% nonionic surfactant, about 15% to about 35% by weight dimethyl ether and about 25% to about 75% water. In this application all parts are parts by weight of the total emulsion unless expressly specified otherwise.

Advantageously, the compositions of this invention employ the water-soluble propellant dimethyl ether (DME), which in contrast to the environmentally objectionable fluorocarbon propellants, is generally regarded as environmentally safe. Dimethyl ether is a commercially available liquefiable gas having a boiling point of −23° C. at one atmosphere, and is soluble in water to the extent of about 35% by weight at 24° C. at about 5 atmospheres of pressure.

The film-forming polymer employed in the composition of this invention is one which is emulsifiable in water with nonionic surfactants, and is not otherwise incompatible with DME or the nonionic surfactant component. The weight-average molecular weight of preferred polymers is, i.e., from about 100,000–200,000. Among the film-forming polymers which can be utilized in the compositions of this invention are homopolymers and copolymers of various monomers, including vinyl esters of saturated carboxylic acids, for example: vinyl acetate, vinyl propionate, or the like; alkyl or aryl esters of unsaturated carboxylic acids, including acrylates and methacrylates such as ethyl acrylate, butyl acrylate, 2-ethylhexyl acrylate, methyl methacrylate and the like; and vinyl acetate ethylene copolymers having, for instance, 30–90% vinyl acetate therein. Examples of preferred film-formers at room temperature include acrylate polymers such as AC-33 (46% solids, pH, 9.4–9.9, min. film-forming temp. of 9° C.) and LC-45 (64.5% solids, pH 4.5–5.3, visc. 280 cps) which are aqueous emulsions of polyethylacrylates and which may contain up to 1% acrylic acid. These aqueous emulsions are commercially available from Rohm and Haas Inc. Other preferred film-formers include vinyl acetate copolymers such as the vinyl acetate copolymer latexes, such as a latex of 75% vinyl acetate and 25% dibutyl maleate, and a vinyl acetate copolymer latex of 75% vinyl acetate and 25% ethylhexyl acrylate.

Polymeric materials commercially available as aqueous emulsions (oil-in-water) may be employed. Such polymeric emulsions include a surfactant emulsifier in the commercially available polymer formulation. However, these commercial emulsions typically employ a relatively minor amount of emulsifier in comparison to the amounts employed in the formulations of this invention, and it is believed that the use of nonionic surfactant emulsifiers having HLB values greater than about 14 in the amounts disclosed herein is necessary to allow formation of substantially foam-free films despite the presence of an emulsifier surfactant in the commercially available polymer emulsion.

Any interface active dipolar substance may be correlated with a numerical value in a scale which runs from 1 through 45 and higher. These numerical values, the so-called HLB values, represent a measure of the degree of the lipophilic or hydrophilic nature of the respective substances; lipophilic substances have a low HLB number and the HLB value will increase as the hydrophilic character increases. The boundary value between lipophilicity and hydrophilicity is approximately at HLB 10.

The hydrophile-lipophile balance can be based on either analytical or composition data and for many polyhydric alcohol-fatty acid ester emulsifiers can be calculated from the formula:

$$HLB = 20(1-S/A)$$

wherein S is the saponification number of the ester and A is the acid number of the acid. In those instances where the fatty acid esters do not provide adequate saponification number data, the following formula can be utilized:

$$HLB = (E+P)/5$$

wherein E is the weight percent of oxyethylene content of the surfactant and P is the weight percentage of polyhydric alcohol content (glycerol, sorbitol, etc.).

For the emulsifiers wherein only ethylene oxide is used as the hydrophilic portion, and for fatty alcohol ethylene oxide condensation products, the equation immediately above may be simplified to read as follows:

$$HLB = E/5$$

wherein E is the weight percentage of oxyethylene content of the surfactant. A discussion of the calculation of HLB values for various surfactants is provided by Becker, *Emulsions Theory and Practice*, Reinhold Publishing Co. (1957), pp. 189–199, which is incorporated herein by reference.

The compositions of this invention employ a nonionic surfactant as an emulsifier having a hydrophile-lipophile balance of about 14 or above, for example, 14.0 to about 18.9, and the water-soluble propellant dimethyl ether. It has been found that a nonionic surfactant having an HLB value in the range of 14 or above will promote the formation of a stable emulsion which may be propelled by the water soluble propellant dimethyl ether—that is, an emulsion which is capable of being sprayed in a fine mist to provide a foam-free, coherent film which at the same time has sufficient mechanical stability to resist shearing and running during dispensing.

Nonionic surfactants are those in which the affinity for water or hydrophobicity is due to the present of nonionizing polar groups. Any nonionic surfactant having the requisite HLB value of about 14 or above may be employed in the compositions of this invention. For example, nonionic surfactants useful in the present invention include alkyl-substituted-phenoxy polyoxyethylene ethanols wherein the alkyl group is at least of seven carbon atoms and the ethanoxy ($-CH_2-CH_2-O-$) groups number at least about 10; and the alkoxy-polyoxyethylene ethanols wherein the ethanoxy groups number at least about 10, and the alkoxy group is at least of about 8 carbon atoms. When the molar ratio of ethylene oxide which is condensed with the phenol or alcohol in such compounds is about 10 or above, the HLB of such surfactants will generally be greater than about 14. An ethylene oxide to phenol or alcohol mole ratio of less than about 7 will generally yield an adduct with an HLB lower than the preferred value. For example, long-chain fatty-alcohol ethylene-oxide condensates comprised of about 10 to about 70 moles of ethylene oxide per mole of the alcohol, and having an HLB value of about 14 or higher are well suited for use in the compositions of this invention, i.e., octylphenol-ethylene oxide adducts, nonylphenolethylene oxide adducts, lauryl alcohol-ethylene oxide adducts, and the like.

Suitable nonionic surfactants for use in the formulations described herein are commercially available, e.g., octyphenol-ethylene oxide adducts are available from Rohm and Haas Inc. (Triton X series), the nonylphenol-ethylene oxide adducts are available from Jefferson Chemical Company (Surfonic N series) and linear lauryl alcohol ethylene oxide adducts are available from Continental Chemical Company (Alfonics).

Anionic surfactants are not effective in the compositions of this invention. Examples of anionic surfactants are potassium oleate (HLB 20), triethanolamine oleate (HLB 12), sodium lauryl ether sulfate (HLB 45) and sodium lauryl sulfate (HLB 40) which do not adequately suppress foam formation or impart sufficient mechanical stability to a dimethyl ether propelled water-based formulation, despite their high HLB values.

The compositions of this invention may also employ an amount of a conventional dye or pigment sufficient to impart color to the film coating dispensed. Suitable pigments include calcium carbonate, titanium dioxide, titanium dioxide-barium sulfate, titanium dioxide-calcium sulfate, barium sulfate, barium carbonate, mica, talc, diatomaceous silica, colloidal silica, pyrophylate, $CaSO_4$ (gypsum), magnesium silicate ($3MgO.SiO_2.H_2O$), magnesium carbonate ($MgCO_3$), China Clays ($Al_2O_2.2SiO_2.2H_2O$), or mixtures thereof.

Optical brighteners and fluorescent materials may also be included in the formulations disclosed herein. Examples of fluorescent and optical brighteners include, for example, stilbenic compounds such as 4,4'-bis(p-amino-benzamide)stilbene-2,2'-disulfonate, 4-4'-bis(benzoxazol-2-yl)stilbene, 4,4'-bis(5-methoxybenzoxazol-2-yl)stilbene; as well as such well known fluorescent pigments as finely powdered pink, orange, green, red or yellow organic pigments, which are conventional in this art.

The compositions of this invention may be applied as films to various surfaces or substrates. For example, films of this composition may be applied to wood, steel, cement or stucco-type surfaces employed in the construction industries.

The compositions of this invention can be prepared, and aerosol dispensers readily filled with them, e.g., by pressure-filling a suitable container or by another conventional method. For example, the polymeric component and pigment may be emulsified in water by the nonionic surfactant component, and the resulting emulsion concentrate added to an open aerosol container. Preferably, the film-forming polymer and pigment are added to water, and then the nonionic surfactant is added, emulsifying the system and providing a uniform dispersion of the solids in the water. After the emulsification step, the container is sealed with a closure having a dispensing valve suitable to deliver a fine mist type spray, e.g., a vapor tap valve adapted for continuous dispensing of the pressurized composition, once the valve is activated. A large cylinder or another aerosol container containing liquid dimethyl ether under pressure is then connected to the container containing the emulsion. The dimethyl ether is charged into the dispensing container through the valve and equilibrates between the gaseous and liquid phases to achieve a final pressure of preferably 40-60 psi.

The following specific examples are presented to more fully illustrate this invention.

EXAMPLE 1

Aerosol water-based paint compositions were prepared and evaluated according to the following general procedure. Twenty parts by weight of a 60% aqueous emulsion of polyethylacrylate (LC-45, Rohm and Haas) were mixed with 0.8 parts by weight of a surfactant (Triton X405 which is an octylphenolethylene oxide adduct having 40 moles of ethylene oxide per mole of octylphenol) and 2.0 parts by weight of finely divided calcium carbonate to form a concentrate. This concentrate was then diluted with 57.2 parts of water and then added to an aerosol container fitted with a standard vapor tap valve. The air was evacuated from the container, which was then pressurized with 20 parts by weight of dimethyl ether.

EXAMPLES 2-16

In Examples 2-16, aerosol paint compositions were prepared in accordance with Example 1 with the exception that the surfactants listed in Table I were substituted for the surfactant employed by the formulation of Example 1. Each of these formulations was sprayed from the aerosol container to provide a film which on a glass surface. The film produced by each composition was visually examined for evidence of foam formation.

Aerosol dispensed formulations are subjected to high shear forces when dispensed from an aerosol container. These high shear forces in some cases cause a dispensed polymer-based composition to coagulate, which is exhibited in the form of visible agglomerates in the film produced. A formulation suitable for dispensing from an aerosol container should have sufficient mechanical stability to withstand high shear forces and at the same time to provide a film free from objectionable agglomerates.

In Examples 1-16 the film produced by the spray was visually examined for evidence of agglomeration or coagulation. Where no agglomeration was observed, the mechanical stability of the dispersed formulation was rated as "E," or as having mechanical stability. Where objectionable agglomeration was observed, the dispensed formulation was rated as "P," or as not having acceptable mechanical stability.

TABLE I

PAINT COMPOSITIONS

| Example | Surfactant Class | Moles ethylene oxide/ Moles phenol or alcohol | HLB Value | Mechanical Stability | Foam Development |
|---|---|---|---|---|---|
| 1 | Octylphenol-ethylene oxide adduct | 40 | 18.1 | E | No |
| 2 | Octylphenol-ethylene oxide adduct | 70 | 18.2 | E* | No |
| 3 | Octylphenol-ethylene oxide adduct | 10 | 14.0 | E | No |
| 4 | Octylphenol-ethylene oxide adduct | 5 | 10.8 | P** | Yes |
| 5 | Nonylphenol-ethylene oxide adduct | 70 | 18.7 | E | No |
| 6 | Nonylphenol-ethylene oxide adduct | 40 | 17.9 | E | No |
| 7 | Nonylphenol-ethylene oxide adduct | 10 | 13.5 | F | Some |
| 8 | Nonylphenol-ethylene oxide adduct | 5 | 10.2 | P | Yes |
| 9 | Lauryl alcohol-ethylene oxide adduct | 70 | 18.9 | E | No |

TABLE I-continued
PAINT COMPOSITIONS

| Example | Surfactant Class | Moles ethylene oxide/ Moles phenol or alcohol | HLB Value | Mechanical Stability | Foam Development |
|---|---|---|---|---|---|
| 10 | Lauryl alcohol-ethylene oxide adduct | 40 | 18.3 | E | No |
| 11 | Lauryl alcohol-ethylene oxide adduct | 10 | 14.5 | E | No |
| 12 | Lauryl alcohol-ethylene oxide adduct | 5 | 11.3 | P | Yes |
| 13 | Sodium Lauryl Sulfate | — | 40 | P | Yes |
| 14 | Sodium Lauryl Ether Sulfate | — | 45 | P | Yes |
| 15 | Triethanol Amine Oleate | — | 12 | P | Yes |
| 16 | Potassium Oleate | — | 20 | P | Yes |

*Excellent mechanical stability.
**Poor mechanical stability.

From the results set forth in Table I, it is observed that compositions containing the nonionic surfactants of Examples 1-3, 5-6, and 9-11 are effective to provide formulations of excellent mechanical stability and to provide films which do not develop foam upon application. The nonionic surfactants employed in these Examples have HLB values in the range of 14.0 to 18.9 but nonionic surfactants with HBL values of greater than 18.8 should also provide non-foaming paint films of acceptable mechanical stability.

On the other hand, nonionic surfactants with HLB values of less than about 14.0, i.e., Examples 4, 7-8 and 12, and all of the anionic surfactants used (Examples 13-16) resulted in compositions which provided unsatisfactory paint films exhibiting both foaming and poor mechanical stability.

While certain representative embodiments of the present invention have been shown for the purpose of more particularly illustrating the invention, it will be apparent to those skilled in the art that various changes and modifications may be made therein without departing from the scope and spirit of the invention.

We claim:

1. A composition suitable for dispensing from an aerosol container by the action of dimethyl ether propellant comprising an aqueous emulsion of a film-forming polymer, and a propellant amount of dimethyl ether, wherein the film-forming polymer is emulsified by a nonionic surfactant having an HLB value of at least about 14, and said composition when dispensed from an aerosol container provides a smooth and foam-free film on the substrate to which it is applied.

2. The composition according to claim 1 wherein said emulsion comprises about 2 to about 25 parts by weight of film-forming polymer, about 0.3 to about 3.0 parts by weight of said nonionic surfactant, about 0.2 to about 10 parts by weight of a pigment, and dimethyl ether dissolved in said emulsion in the amount of about 10 parts by weight of said emulsion and up to the limit of the solubility of dimethyl ether in said emulsion when said emulsion is subjected to about 40 to about 60 psi dimethyl ether gaseous propellant pressure at room temperature; and said emulsion includes about 2% to about 35% solids.

3. The composition according to claim 2 wherein said emulsion comprises by weight about 3% to about 15% of the film-forming polymer, about 0.2% to about 10% by weight pigment, about 0.5% to about 2.0% surfactant, and about 15% to about 35% by weight dimethyl ether dissolved in said emulsion.

4. The composition according to claim 3 wherein said film-forming polymer is selected from the group consisting of polyethylacrylates, vinyl esters of saturated carboxylic acids, alkyl or aryl esters of unsaturated carboxylic acids, vinyl acetate-ethylene copolymers, vinyl acetate copolymers, and vinyl acetate copolymer latexes.

5. The composition according to claim 4 wherein said emulsion is comprised of a vinyl acetate copolymer latex selected from the group consisting of a latex of 75% vinyl acetate and 25% dibutyl maleate and a latex of 75% vinyl acetate and 25% ethylhexyl acrylate.

6. The composition according to claim 1 or claim 2 wherein said nonionic surfactant is selected from the group consisting of octylphenol-ethylene oxide adducts, nonylphenolethylene oxide adducts and lauryl alcohol-ethylene oxide adducts, and said film-forming polymer is a polyethylacrylate.

7. The composition according to claim 2 wherein said nonionic surfactant is an alkyl-substituted-phenoxy polyoxyethylene ethanol wherein the alkyl group is at least about seven carbon atoms and the ethanoxy groups number at least about 10; or an alkoxy-polyoxyethylene ethanol wherein the ethanoxy groups number at least about 10 and the alkoxy group is of at least about 8 carbon atoms.

8. The composition according to claims 2 or 3 wherein said pigment is calcium carbonate, and said film-forming polymer is a polyethylacrylate.

9. The composition according to claim 1 wherein said emulsion comprises about 77 parts by weight of an aqueous emulsion of polyethylacrylate, about 0.8 parts by weight of a nonionic surfactant which is an octylphenol-ethylene oxide adduct having 40 moles of ethylene oxide per mole of octylphenol, and about 2.0 parts by weight calcium carbonate.

10. An aerosol dispenser containing therein a dispensable composition comprising a film-forming polymer emulsified in an aqueous solution of dimethyl ether, wherein said film-forming polymer is emulsified by a nonionic surfactant having an HLB value of at least about 14 or above, and said emulsion being under dimethyl ether gas propellant pressure in said dispenser sufficient to propel said emulsion from said dispenser and onto the surface of a substrate to provide a smooth and foam-free film on the substrate to which it is applied.

11. The dispenser according to claim 10 wherein said emulsion comprises about 2 to about 25 parts by weight of film-forming polymer, about 0.3 to about 3.0 parts by weight of said nonionic surfactant, about 0.2 to about 10 parts by weight of a pigment, and dimethyl ether dissolved in said emulsion in an amount of about 10 parts by weight of said emulsion and up to the limit of the solubility of dimethyl ether in said emulsion when said emulsion is subjected to about 40 to about 60 psi dimethyl ether gaseous propellant pressure at room temperature; and said emulsion includes about 2% to about 35% solids.

12. The dispenser according to claim 11 wherein said emulsion comprises by weight about 5% to about 15% of the film-forming polymer, about 0.3% to about 10% by weight pigment, about 0.5% to about 2.0% surfactant, and about 15% to about 35% by weight dimethyl ether dissolved in said emulsion.

13. The dispenser according to claim 12 wherein said film-forming polymer is selected from the group consisting of polyethylacrylates, vinyl esters of saturated carboxylic acids, alkyl or aryl esters of unsaturated carboxylic acids, vinyl acetate-ethylene copolymers, vinyl acetate copolymers, and vinyl acetate copolymer latexes.

14. The dispenser according to claim 10 wherein said emulsion comprises about 77 parts by weight of an aqueous emulsion of polyethylacrylate, about 0.8 parts by weight of nonionic surfactant, and about 2.0 parts by weight calcium carbonate.

15. The composition according to claim 1, 2, 3, 7 or 9 wherein said polymer is an acrylic polymer and said film comprises a paint film.

16. The composition according to claim 1, 2, 3, 7 or 9 wherein said HLB value is in the range of about 14.0 to about 18.9, and said film comprises a paint film.

17. The aerosol dispenser according to claim 10, 11 or 12 wherein said polymer is an acrylic polymer, and said film comprises a paint film.

18. The aerosol dispenser according to claim 10, 11 or 12 wherein said HLB value is in the range of about 14.0 to about 18.9, and said film comprises a paint film.

19. The aerosol dispenser according to claim 10 wherein said emulsion includes a pigment, said nonionic surfactant is selected from the group consisting of octylphenol-ethylene oxide adducts, nonylphenol-ethylene oxide adducts and lauryl alcohol-ethylene oxide adducts, and said film comprises a paint film.

* * * * *